(12) United States Patent
Dahlheimer

(10) Patent No.: US 7,963,526 B2
(45) Date of Patent: *Jun. 21, 2011

(54) PRELUBRICATED MULTI-LIPPED RADIAL SHAFT SEAL WITH LARGE RADIAL OFFSET ACCOMMODATION

(75) Inventor: John C. Dahlheimer, Laconia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 508 days.

This patent is subject to a terminal disclaimer.

(21) Appl. No.: 11/748,744

(22) Filed: May 15, 2007

(65) Prior Publication Data

US 2008/0284110 A1 Nov. 20, 2008

(51) Int. Cl.
*F16J 15/32* (2006.01)

(52) U.S. Cl. ........ 277/564; 277/561; 277/563; 277/569; 277/559

(58) Field of Classification Search .................. 277/561, 277/563, 564, 566, 569, 559
See application file for complete search history.

(56) References Cited

U.S. PATENT DOCUMENTS

| | | | |
|---|---|---|---|
| 1,416,988 A | | 5/1922 | Sherwood |
| 1,733,416 A | | 10/1929 | Lebesnerois |
| 1,797,223 A | | 3/1931 | Annis |
| 2,177,441 A | * | 10/1939 | Pesarese ........................ 277/563 |
| 2,249,141 A | | 7/1941 | Johnson |
| 2,482,029 A | | 9/1949 | Reynolds |
| 2,574,062 A | * | 11/1951 | Reynolds ........................ 277/569 |
| 2,743,950 A | | 5/1956 | Helfrecht et al. |
| 3,501,155 A | * | 3/1970 | Dega et al. ..................... 277/309 |
| 3,871,666 A | * | 3/1975 | Franz et al. ..................... 277/563 |
| 3,871,669 A | * | 3/1975 | Repella ........................... 277/503 |
| 3,920,250 A | * | 11/1975 | Eklund ........................... 277/555 |
| 4,000,933 A | | 1/1977 | Derman et al. |
| 4,118,856 A | * | 10/1978 | Bainard et al. .................. 29/511 |
| 4,172,599 A | * | 10/1979 | Forch ............................. 277/552 |
| 4,274,641 A | | 6/1981 | Cather, Jr. |
| 4,288,083 A | * | 9/1981 | Braconier ..................... 277/559 |
| 4,553,763 A | | 11/1985 | Ehrmann |
| 4,588,195 A | * | 5/1986 | Antonini et al. .............. 277/504 |
| 4,750,748 A | | 6/1988 | Visser |
| 4,844,484 A | * | 7/1989 | Antonini et al. .............. 277/561 |
| 5,085,444 A | * | 2/1992 | Murakami et al. ............ 277/503 |
| 5,139,275 A | * | 8/1992 | Ehrmann et al. .............. 277/559 |
| 5,573,336 A | * | 11/1996 | Maroney ....................... 384/146 |
| 5,897,119 A | * | 4/1999 | McMillen ..................... 277/562 |
| 5,921,555 A | * | 7/1999 | Johnston ....................... 277/559 |
| 6,298,955 B1 | * | 10/2001 | Frost ............................. 188/72.9 |

(Continued)

*Primary Examiner* — Alison K Pickard
(74) *Attorney, Agent, or Firm* — Ronald W. Wangerow, Esq.; Harness, Dickey & Pierce, P.L.C.

(57) ABSTRACT

A radial shaft seal is provided for accommodating large radial offset of the shaft relative to a housing. The seal includes an annular retainer insert provided for engaging the seal to a fixed housing. An annular elastomeric seal body is molded to the retainer insert and includes a flexible axially extending portion extending from an inner surface of the retainer insert. A seal portion extends from a radially inward end of the flexible portion and includes first and second seal lips and an elastomeric bearing surface disposed between the first and second sealing lips. The bearing surface includes a plurality of raised pads adapted to engage the shaft. The pads each include a rounded edge on lateral sides thereof for encouraging the creation of a lubricating film between the pads and shaft. The pads are lubricated by a lubricant disposed in a lubricant chamber disposed between the first and second seal lips.

22 Claims, 3 Drawing Sheets

U.S. PATENT DOCUMENTS

| | | | |
|---|---|---|---|
| 6,315,302 B1 * | 11/2001 | Conroy et al. | 277/559 |
| 6,601,855 B1 * | 8/2003 | Clark | 277/549 |
| 6,726,211 B1 * | 4/2004 | Kuroki et al. | 277/353 |
| 6,814,668 B2 * | 11/2004 | Grupido | 464/133 |
| 2006/0138729 A1 * | 6/2006 | Arai et al. | 277/559 |
| 2008/0258406 A1 * | 10/2008 | Dahlheimer | 277/569 |

* cited by examiner

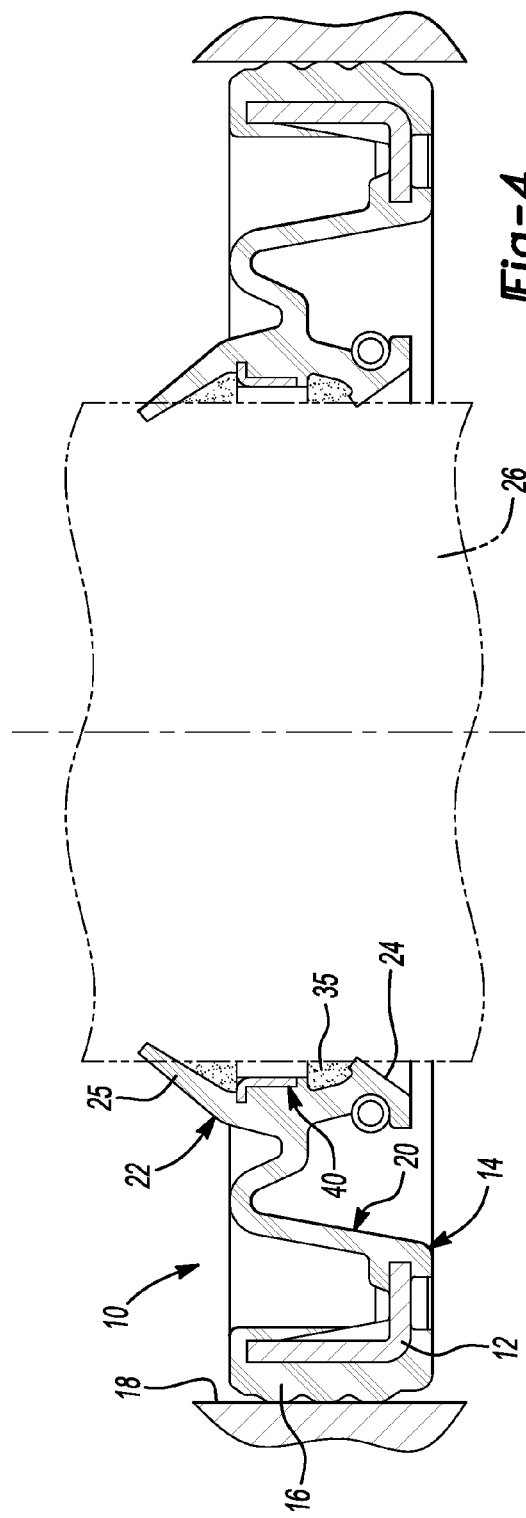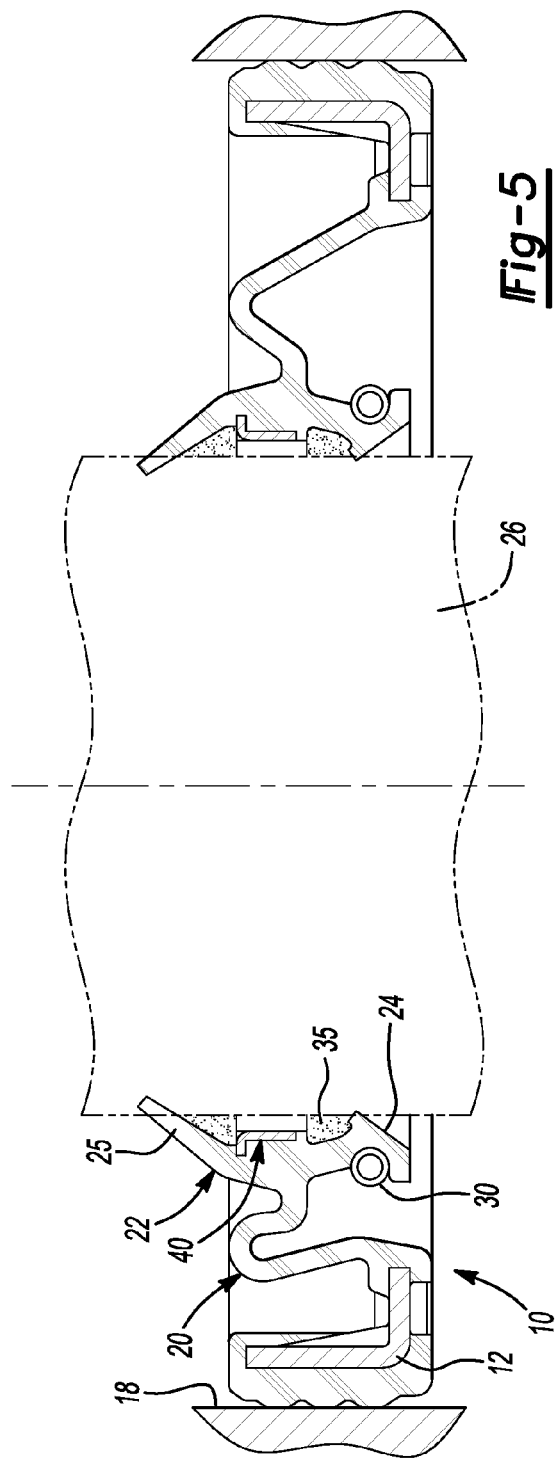

PRELUBRICATED MULTI-LIPPED RADIAL SHAFT SEAL WITH LARGE RADIAL OFFSET ACCOMMODATION

FIELD

The present disclosure relates to radial shaft seals and more particularly, to a prelubricated multi-lipped radial shaft seal which can accommodate for a large radial offset.

BACKGROUND AND SUMMARY

The statements in this section merely provide background information related to the present disclosure and may not constitute prior art.

Radial shaft seals are commonly provided for sealing between a housing and a rotary shaft passing through the housing. One problem with radial shaft seals is that shaft offset or other misalignment and/or dynamic run out conditions relative to the housing bore can cause the seal lip to be unable to follow and thus lift off the shaft, allowing fluid to escape and leak past the seal. Radial shaft seals often utilize a fluid being sealed (oil, water) to lubricate and cool the seal lips. However, during some periods of operation, such as the spin cycle of a washing machine, the fluid (water) may be missing from the seal environment and therefore, does not provide the lubricating or cooling function. Accordingly, the present disclosure provides a radial shaft seal capable of accommodating large amounts of shaft misalignment, radial offset and dynamic run out while also being pre-lubricated.

The radial shaft seal of the present disclosure provides an annular outer rigid insert adapted to reinforce an elastomeric rind portion surrounding and extending axially along the tubular portion of the outer rigid insert to effect a sealing press-fit into the interior of a housing bore. The elastomeric rind portion terminates and wraps inward around an inward radiating wall end portion of the outer rigid insert where the elastomer forms into a flex portion that extends axially, which is radially spaced from the tubular portion of the outer rigid insert. This flex portion terminates and is attached to an elastomeric bearing portion of the seal. The elastomer flows axially along and around the outside of an inner rigid insert where it joins with the elastomer of the reinforced bearing portion and forms a pair of flexible seal lips that hug and seal around the shaft, the sealing action of a first seal lip is intensified and assured by a garter spring mounted around the flexible seal lip while a second seal lip, along with the first seal lip, defines an enclosed lubrication chamber. The lubrication chamber contains lubrication for the seal lips and bearing portion.

The reinforced elastomeric bearing portion includes a plurality of raised ribs the innermost bearing surfaces of which lie tangentially to the shaft surface and which have either a flat or slightly convex shape but which includes rounded edges at the intersection of the sides of the raised ribs and the bearing surfaces. The bearing surfaces of the ribs form an acute angle with the surface of the shaft which facilitates the carrying of liquid fed from the grooves between the ribs and which forces the fluid into the acute angles thus wedging the fluid between the reinforced elastomeric bearing interior surfaces and the shaft exterior creating a full film elastohydrodynamic lubrication regime between the reinforced bearing interior and the shaft exterior. The reinforced bearing portion being attached to the adjacent flexible seal lips causes the bearing and seal lip portions to be held circular and concentric, and to track true to the shaft being sealed regardless of considerable shaft to bore misalignment, offset and dynamic run out, thus assuring excellent sealing efficiency.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a cross-sectional view of the radial shaft seal according to the principles of the present disclosure engaging a shaft having zero offset relative to a housing;

FIG. 5 is a view similar to FIG. 4 illustrating the shaft having a radial offset that is accommodated for by the radial shaft seal.

DETAILED DESCRIPTION

The following description is merely exemplary in nature and is not intended to limit the present disclosure, application, or uses.

Figure 1:
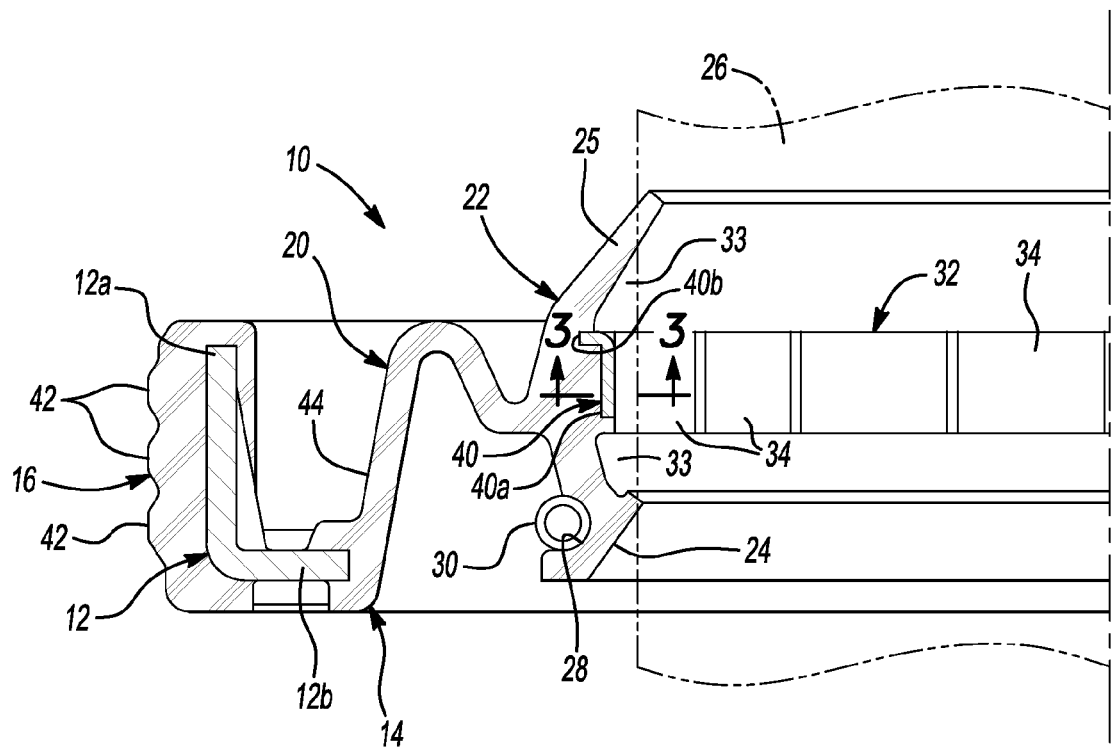
FIG. 1 is a cross-sectional view of a radial shaft seal according to the principles of the present disclosure.
Figure 2:
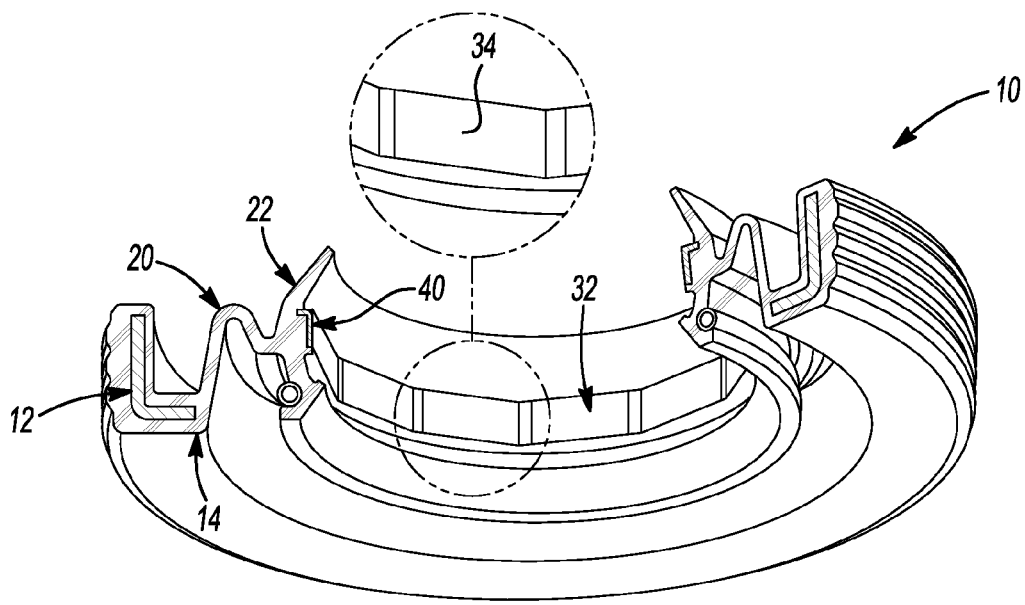
FIG. 2 is a partial cut away perspective view of the radial shaft seal of FIG. 1.
Figure 3:
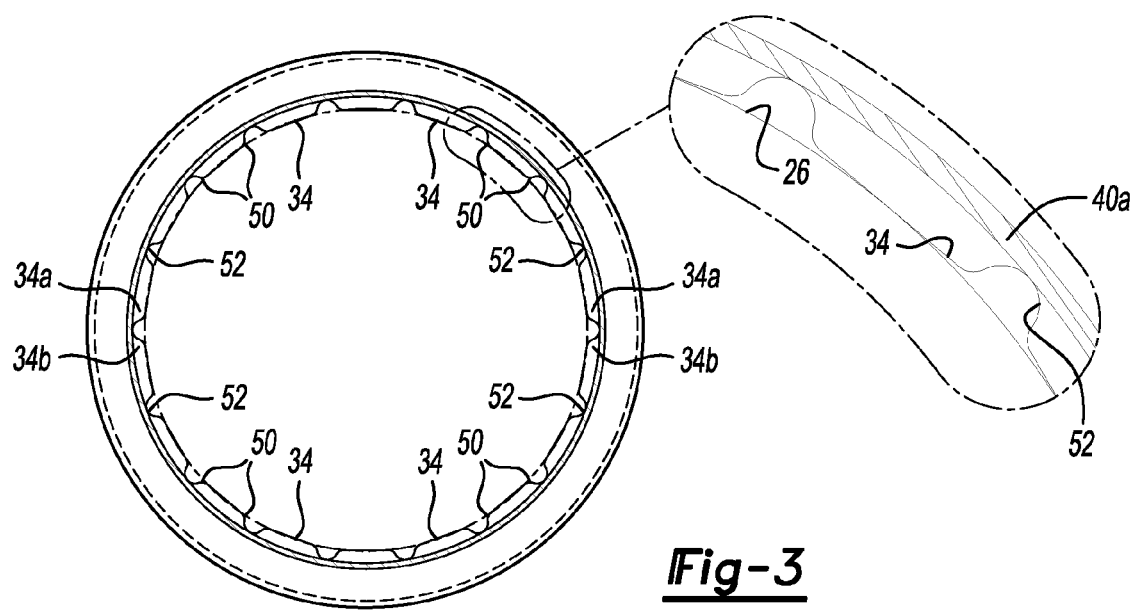
FIG. 3 is a partial cross-sectional view taken along line 3-3 of FIG. 1, illustrating the raised pads of the bearing surface according to the principles of the present disclosure.

With reference to FIGS. 1-5, a radial shaft seal 10 according to the principles of the present disclosure will now be described. As shown in FIG. 1, the radial shaft seal 10 includes an annular retainer insert 12 having an annular elastomeric seal body 14 molded to the retainer insert 12. The seal body includes an over-molded portion 16 molded to the retainer insert 12 while providing a sealed connection with a housing 18 as best illustrated in FIGS. 4 and 5.

A flexible thin walled flex section portion 20 extends axially from an inner surface of the retainer insert 12. A seal portion 22 extends radially inward from a radially inward end of the flex section portion 20 and includes a first seal lip 24 and a second seal lip 25 each extending radially inwardly for engaging a shaft 26. A spring recess 28 is provided radially outward of the first seal lip 24 and receives a garter spring 30 therein. An elastomeric bearing portion 32 is disposed between the first seal lip 24 and the second seal lip 25. The first seal lip 24 and the second seal lip 25 engage the shaft 26 and define a lubricant chamber or pockets 33 therebetween for containing a lubricant 35 such as grease to lubricate the seal lips 24, 25 and bearing portion 32. The bearing portion 32 includes a plurality of raised pads 34 which engage the shaft 26. The seal portion 22 includes an annular seal insert 40 embedded within the elastomeric material of the seal portion 22 radially outward from the bearing portion 32.

The annular retainer insert 12 can include a generally L-shaped cross-section with a radially outermost axially extending portion 12a and a radially inwardly extending portion 12b extending from an end of the axially extending portion 12a. The retainer insert 12 provides a rigid support for the elastomeric material 16 over-molded to the outer surface thereof for providing a sealed engagement with the housing

18. The over-molded portion 16 can include one or more raised beads 42 (three of which are shown) for enhancing the sealing engagement.

The thin walled flex section 20 includes an axially extending portion 44 that allows the bearing portion 32 and seal portion 22 to move inward and outward along with the shaft as illustrated in FIG. 5 to accommodate for shaft offset.

The raised pads 34 of the elastomeric bearing portion 32 can each include a rounded edge 50 on lateral sides 34*a*, 34*b* thereof. A plurality of axially extending grooves 52 are disposed between the plurality of raised pads. The rounded edges 50 provided on the lateral sides 34*a*, 34*b* of the raised pads 34 allow oil, grease, or other lubricating materials to form a film between the pads 34 and shaft 26 without scraping away the lubricating film. In the embodiment shown, eighteen pads 34 are utilized, although it should be understood that more or fewer pads such as 6, 8, 10, 16, or 20 pads, etc. can be utilized so long as the bearing surface is capable of positioning and causing the sealing lip adjacent the bearing to be held circular and concentric to the shaft being sealed regardless of considerable shaft/seal offset. The pads may be either flat (as shown) or have a slightly convex shape which lie tangentially to the shaft and form an acute angle to it.

The rigid annular seal insert 40 can have an axially extending portion 40*a* disposed radially outward from the bearing portion that securely maintains the bearing portion 32 against the shaft 26. The insert 40 can also include a radially outwardly extending portion 40B to enhance its rigidity.

Figure 6:
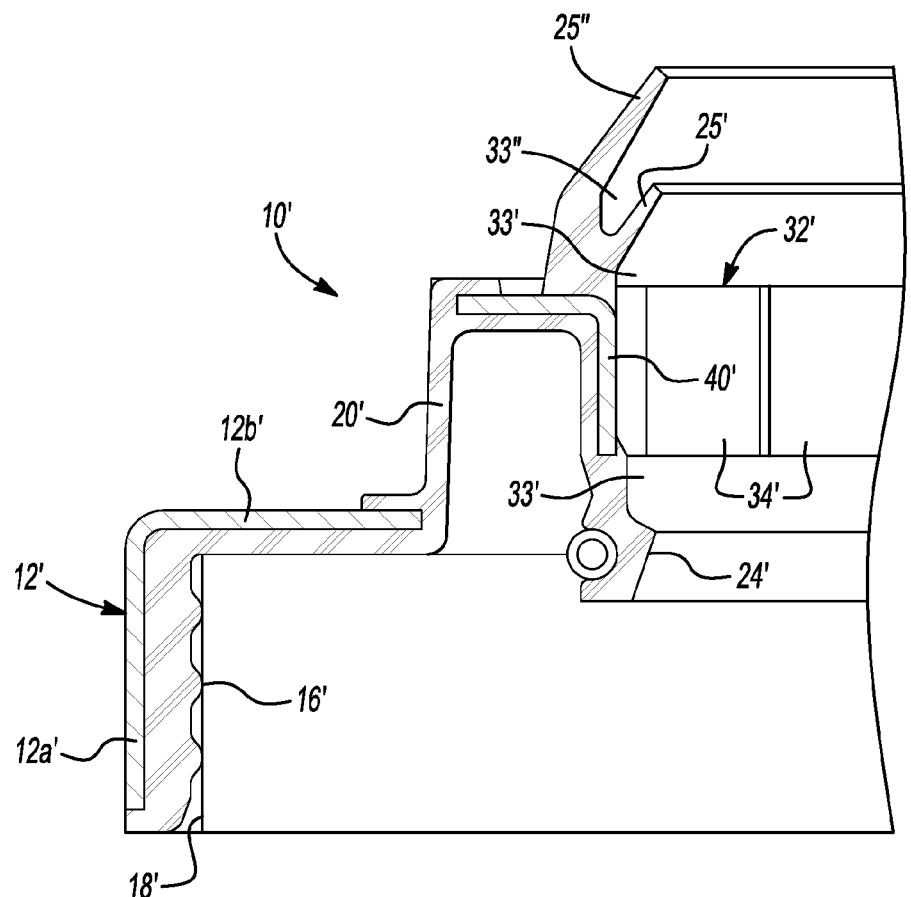
FIG. 6 is a cross-sectional view of a radial shaft seal according to the principles of the present disclosure.

With reference to FIG. 6, an alternative radial shaft seal 10' is shown wherein the same or similar elements or features as discussed above are labeled with the same number designated with a prime (') symbol. In FIG. 6, the radial shaft seal 10' is designed to engage an outer surface of a housing member whereby the retainer insert 12' is provided with an interior over-molded portion 16' for engaging an outer surface of the housing member 18'. In this embodiment, the flex section portion 20' extends axially away from the axially extending portion 12*a'* of the retainer insert 12', and the seal portion 22' is provided with a third seal lip 25" adjacent to the second seal lip 25'. Additional lubricant 35 can be provided in a second lubricant chamber 33" defined between the second and third seal lips 25' and 25".

It should be understood that features of the radial shaft seals 10, 10' can be mixed and matched without departing from the scope of the present disclosure.

What is claimed is:

1. A radial shaft seal for providing a seal between a fixed housing and a rotating shaft, comprising:
 an annular retainer insert; and
 an annular elastomeric seal body molded to said retainer insert, said seal body including an over-molded portion bonded to said retainer insert, a flexible axially extending portion extending from an inner surface of said retainer insert, and a seal portion extending from a radially inward portion of said axially extending portion, said seal portion including a first sealing lip and a second sealing lip with an elastomeric bearing portion disposed axially between said first and second sealing lips and an annular seal insert having a generally L-shaped cross-section;
 wherein said elastomeric bearing portion includes a plurality of raised pads adapted to engage the shaft, said plurality of raised pads each include a rounded edge on lateral sides thereof;
 wherein said seal insert is molded within said seal body and in close proximity to said plurality of raised pads.

2. The radial shaft seal according to claim 1, wherein said annular retainer insert includes a generally L-shaped cross-section with a radially outermost axially extending retainer portion and a radially inwardly extending retainer portion extending from an end of said axially extending retainer portion of said annular retainer insert, said axially extending retainer portion being adapted to be mounted to a housing.

3. The radial shaft seal according to claim 1, wherein said bearing portion includes a plurality of axially extending grooves disposed between said plurality of raised pads.

4. The radial shaft seal of claim 1, wherein said bearing portion raised pads are lubricated by a lubricant disposed in a lubricant chamber disposed between said first and second sealing lips.

5. The radial shaft seal of claim 4, wherein said first and second sealing lips are lubricated by said lubricant.

6. The radial shaft seal according to claim 1, wherein said plurality of pads includes at least 6 pads.

7. The radial shaft seal according to claim 1, wherein a garter spring is disposed radially outward of said first sealing lip on an air side of the seal.

8. The radial shaft seal according to claim 1, wherein a pressure of a liquid being sealed acts radially inward on the exterior surface of said flexible axially extending portion.

9. The radial shaft seal according to claim 1, further comprising a third sealing lip disposed adjacent to said second sealing lip.

10. The radial shaft seal according to claim 9, wherein said second and third sealing lips define a lubricant chamber therebetween.

11. A radial shaft seal for providing a seal between a fixed housing and a rotating shaft, comprising:
 an annular retainer insert;
 an annular elastomeric seal body molded to said retainer insert, said seal body including an over-molded portion bonded to said retainer insert, a flexible axially extending portion extending from an inner surface of said retainer insert, and a seal portion extending from a radially inward portion of said axially extending portion, said seal portion including a first sealing lip and a second sealing lip with an elastomeric bearing portion disposed axially between said first and second sealing lips;
 wherein said elastomeric bearing portion includes a plurality of raised pads adapted to engage the shaft;
 wherein said plurality of raised pads have a flat or slightly convex shape which lie tangentially to the shaft and form an acute angle to it.

12. The radial shaft seal according to claim 11, wherein said seal portion includes an annular seal insert having an axially extending portion disposed radially outward from said bearing portion.

13. The radial shaft seal according to claim 12, wherein said annular seal insert includes a radially outwardly extending portion extending from said axially extending portion of said annular seal insert.

14. An assembly comprising:
 a housing;
 a shaft rotatably mounted relative to said housing; and
 a radial shaft seal disposed between said housing and said shaft, said radial shaft seal including:
 an annular retainer insert; and
 an annular elastomeric seal body molded to said retainer insert, said seal body including an over-molded portion bonded to said retainer insert, a flexible axially extending portion extending from an inner surface of said retainer insert, and a seal portion extending from a radially inward end of said axially extending portion, said seal portion including a first sealing lip and a second sealing lip with an elastomeric bearing portion disposed axially between said first and second sealing lips and engaged with said shaft, and an annular seal insert having a generally L-shaped cross-section;

wherein said elastomeric bearing portion includes a plurality of raised pads engaged with said shaft, said seal insert being molded within said seal body and in close proximity to said plurality of raised pads;

wherein said plurality of raised pads each include a rounded edge on lateral sides thereof and each of the plurality of raised pads have a flat or slightly convex shape which lie tangentially to said shaft and form an acute angle to it.

15. The assembly according to claim 14, wherein said annular retainer insert includes a generally L-shaped cross-section with a radially outermost axially extending retainer portion and a radially inwardly extending retainer portion extending from an end of said axially extending retainer portion of said annular retainer insert, said axially extending retainer portion being mounted to said housing.

16. The assembly according to claim 14, wherein said bearing portion includes a plurality of axially extending grooves disposed between said plurality of raised pads.

17. The radial shaft seal of claim 14, wherein said first and second sealing lips are lubricated by a lubricant disposed in a lubricant chamber disposed between said first and second sealing lips.

18. The assembly according to 14, wherein said plurality of pads includes at least 6 pads.

19. The assembly according to claim 14, wherein a garter spring is disposed radially outward of said first sealing lip on an air side of the seal portion.

20. The assembly according to claim 14, wherein a pressure of a liquid being sealed acts radially inward on the exterior surface of said flexible axially extending portion.

21. The assembly according to claim 14, further comprising a third sealing lip disposed adjacent to said sealing lip.

22. The assembly according to claim 21, wherein said second and third sealing lips define a lubricant chamber therebetween.

* * * * *